US011372507B2

(12) United States Patent
Chen et al.

(10) Patent No.: US 11,372,507 B2
(45) Date of Patent: Jun. 28, 2022

(54) TOUCH SUBSTRATE, MANUFACTURING METHOD THEREOF, AND TOUCH DISPLAY DEVICE

(71) Applicants: HEFEI XINSHENG OPTOELECTRONIC TECHNOLOGY CO., LTD., Anhui (CN); BOE TECHNOLOGY GROUP CO., LTD., Beijing (CN)

(72) Inventors: Jun Chen, Beijing (CN); Qicheng Chen, Beijing (CN); Ming Zhang, Beijing (CN); Jian Yang, Beijing (CN)

(73) Assignees: HEFEI XINSHENG OPTOELECTRONIC TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/647,826

(22) PCT Filed: Sep. 3, 2019

(86) PCT No.: PCT/CN2019/104205
§ 371 (c)(1),
(2) Date: Mar. 16, 2020

(87) PCT Pub. No.: WO2020/192017
PCT Pub. Date: Oct. 1, 2020

(65) Prior Publication Data
US 2021/0216169 A1 Jul. 15, 2021

(30) Foreign Application Priority Data
Mar. 22, 2019 (CN) .......................... 201910222324.2

(51) Int. Cl.
*G06F 3/044* (2006.01)

(52) U.S. Cl.
CPC .. *G06F 3/0446* (2019.05); *G06F 2203/04102* (2013.01); *G06F 2203/04103* (2013.01); *G06F 2203/04107* (2013.01)

(58) Field of Classification Search
CPC ......... G06F 3/0446; G06F 2203/04102; G06F 2203/04103; G06F 2203/04107; G06F 2203/04111; G06F 3/0412; G06F 3/0416
See application file for complete search history.

(56) References Cited

U.S. PATENT DOCUMENTS

| 2013/0015456 A1* | 1/2013 | You ....................... H01L 27/124 257/E33.053 |
| 2014/0198266 A1* | 7/2014 | Park ...................... G06F 3/0446 349/12 |

(Continued)

FOREIGN PATENT DOCUMENTS

| CN | 203930769 U | 11/2014 |
| CN | 104932764 A | 9/2015 |

(Continued)

OTHER PUBLICATIONS

State Intellectual Property Office of the People's Republic of China, Office Action and Search Report Issued in Application No. 20190222324.2, dated Dec. 13, 2019, 13 pages. (Submitted with Partial Translation).

(Continued)

*Primary Examiner* — Amy Onyekaba
(74) *Attorney, Agent, or Firm* — McCoy Russell LLP

(57) ABSTRACT

The present disclosure provides a touch substrate, a manufacturing method thereof and a touch display device. The touch substrate includes: a base substrate; a touch area on the base substrate; a touch electrode made of nano-silver, the touch electrode including first touch electrodes and second touch electrodes, a first insulating layer located on a side of the touch electrode away from a center of the base substrate, (Continued)

a touch electrode bridge on the first insulating layer, the touch electrode bridge connecting adjacent first touch electrodes and/or adjacent second electrodes by way of a first through-hole penetrating the first insulating layer. An etching liquid applied to the touch electrode bridge is different from the etching liquid applied to the nano-silver. The technical solution of the present disclosure can realize a flexible touch substrate by using nano-silver and a photolithography process.

11 Claims, 15 Drawing Sheets

(56) References Cited

U.S. PATENT DOCUMENTS

| | | | |
|---|---|---|---|
| 2014/0224635 A1 | 8/2014 | Chang et al. | |
| 2015/0107978 A1* | 4/2015 | Han | G06F 3/0443 |
| | | | 200/5 R |
| 2015/0346880 A1* | 12/2015 | Xiao | G06F 3/0446 |
| | | | 345/173 |
| 2016/0132183 A1* | 5/2016 | Naoi | G06F 3/0446 |
| | | | 345/174 |
| 2017/0060303 A1* | 3/2017 | Chen | H05K 1/097 |
| 2017/0277302 A1* | 9/2017 | Cho | G06F 3/0446 |
| 2018/0095584 A1* | 4/2018 | Lee | G06F 3/0446 |
| 2019/0171307 A1* | 6/2019 | Li | G06F 3/041 |
| 2019/0235680 A1* | 8/2019 | Ma | G02F 1/13338 |
| 2020/0264731 A1* | 8/2020 | Naganuma | G06F 3/0445 |

FOREIGN PATENT DOCUMENTS

| | | |
|---|---|---|
| CN | 105094444 A | 11/2015 |
| CN | 207281725 U | 4/2018 |
| CN | 108984032 A | 12/2018 |
| CN | 109976578 A | 7/2019 |

OTHER PUBLICATIONS

ISA National Intellectual Property Administration of the People's Republic of China, International Search Report and Written Opinion Issued in Application No. PCT/CN2019/104205, dated Dec. 30, 2019, WIPO, 11 pages.

* cited by examiner

TOUCH SUBSTRATE, MANUFACTURING METHOD THEREOF, AND TOUCH DISPLAY DEVICE

CROSS REFERENCE TO RELATED APPLICATIONS

The present application is a U.S. National Phase of International Application No. PCT/CN2019/104205 entitled TOUCH SUBSTRATE, MANUFACTURING METHOD THEREOF, AND TOUCH DISPLAY DEVICE and filed on Sep. 3, 2019. International Application No. PCT/CN2019/104205 claims priority to Chinese Patent Application No. 201910222324.2 entitled TOUCH SUBSTRATE, MANUFACTURING METHOD THEREOF, AND TOUCH DISPLAY DEVICE and filed on Mar. 22, 2019. The entire contents of each of the above-listed applications are hereby incorporated by reference for all purposes.

TECHNICAL FIELD

The present disclosure generally relates to the field of touch technologies such as a touch substrate, a method for fabricating a touch substrate, and a touch display device.

BACKGROUND

Existing mutual-capacitive touch substrates commonly use indium tin oxide (ITO) to make touch electrodes. However, with the requirements of flexible touch substrates for exhibiting increased flexibility, ITO has been unable to meet the requirements of flexible touch due to the brittle texture of ITO. Nano-silver (nano-scaled wires of silver) exhibits better flexibility relative to ITO and can be used to make touch electrodes of flexible touch substrates. However, etch selectivity of nano-silver materials may be inferior. Due to the etch selectivity concerns, laser engraving has been used for processing nano-silver. Upon patterning nano-silver to prepare a single-layer touch electrode structure, a mutual-capacitive touch substrate may not be realized, and the fabrication precision may be inferior.

SUMMARY

In one example, the issues described above may be addressed by a touch substrate, a manufacturing method thereof, and a touch display device, which can realize a flexible touch substrate by using nano-silver and a photolithography process.

In a first aspect, the present disclosure provides a touch substrate, including a base substrate, a touch region disposed on the base substrate and a touch electrode made of nano-silver, the touch electrode including a first touch electrode arranged along a first direction and a second touch electrode arranged along a second direction, the first direction intersecting the second direction, a first insulating layer on a side of the touch electrode away from a center of the base substrate, a touch electrode bridge on the first insulating layer, the touch electrode bridge connecting adjacent first touch electrodes and/or adjacent second touch electrodes via through-holes penetrating the first insulating layer, an etching liquid applied to the touch electrode bridge different from an etching liquid applied to the nano-silver.

In the preceding example system, additionally or optionally, the touch substrate includes a conductive trace located in a routing area of the base substrate, an insulating pattern on a side of the conductive trace facing away from center of the base substrate, the insulating pattern located between the first insulating layer and the base substrate, and the conductive trace surrounding a touch area, wherein the touch area including the touch electrode.

Optionally, the conductive trace is disposed in the same material as the touch electrodes.

Optionally, the touch substrate also includes:
a touch signal line connected to the touch electrode bridge on the first insulating layer;
and
a second insulating layer on a side of the touch signal line away from the center of the base substrate.

Optionally, the insulating pattern is the same as a pattern of the second insulating layer.

Optionally, the base substrate is a flexible base substrate.

The embodiment of the invention further provides a touch display device comprising the touch substrate as described above.

The embodiment of the invention further provides a method for manufacturing a touch substrate, comprising:
providing a base substrate;
forming a nano-silver layer on the base substrate, wherein the nano-silver layer is patterned by a photolithography process to form a touch electrode in a touch area of the base substrate, the touch electrode including a first touch electrode arranged along a first direction and a second touch electrode arranged along a second direction, the first direction intersecting the second direction;
forming a first insulating layer;
forming a touch electrode bridge on the first insulating layer by using a photolithography process, the touch electrode bridge connecting adjacent first touch electrode and/or the second touch electrode via a first through-hole penetrating the first insulating layer, wherein an etching liquid applied to the touch electrode bridge is different from an etching liquid applied to the nano-silver.

Optionally, after forming of the nano-silver layer on the base substrate and prior to the patterning the nano-silver layer, the method further includes:
forming an insulating pattern on a trace area of the base substrate, the trace area located at a periphery of the touch area, and the insulating pattern is located on the nano-silver layer of the trace area;
wherein the patterning of the nano-silver layer by the photolithography process includes:
patterning a portion of the nano-silver layer not covered by the insulating pattern.

Optionally, the method further includes:
during forming the insulating pattern, forming an alignment mark on a peripheral region of the base substrate, the peripheral region is located at a periphery of the trace area.

Optionally, after forming the touch electrode bridge on the first insulating layer by using the photolithography process, the method further includes:
forming a touch signal line connected to the touch electrode bridge; and
forming a second insulating layer covering the touch signal line.

Alternatively, the insulating pattern and the second insulating layer are formed using the same mask.

In the method described above, after the touch electrode is formed, a first insulating layer covering the touch electrode is formed, wherein the first insulating layer protects the touch electrode in subsequent processes (procedures). When forming the touch electrode bridge, the etching liquid applied to the control electrode bridge is different from the etching liquid applied to the nano-silver so that the etching liquid used for etching the touch electrode bridge does not damage the touch electrode, and the touch capabilities may be ensured. The conductive performance of the electrode is controlled to ensure the performance of the touch substrate. In this embodiment, the touch electrode is made of nano-silver, which exhibits increased flexibility and bendability. In this way, by effectively using nano-silver, a flexible, mutual-capacitive touch substrate having a multilayer structure may be fabricated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the summary above does not constitute an admission that the technical problems and challenges discussed were known to anyone other than the inventors.

DRAWINGS

DETAILED DESCRIPTION

Figure 1:
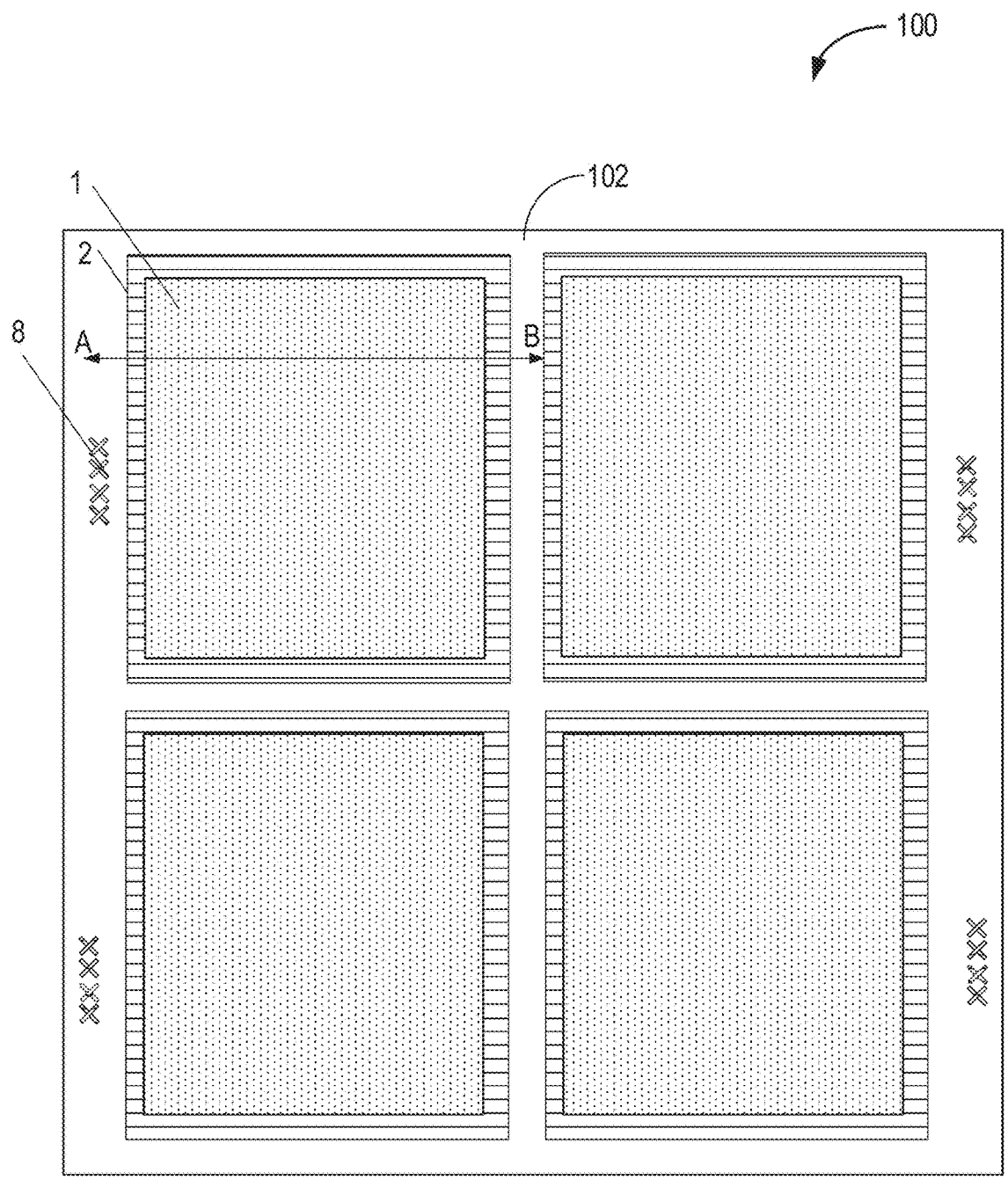
FIG. 1 is a schematic view showing the formation of a nano-silver layer, an alignment mark, and an insulating pattern on a substrate according to an embodiment of the present disclosure.

The following description relates to embodiments of a touch substrate, a method for fabricating the touch substrate, and a touch display device. In the related art, use of a photolithography process to prepare a nano-silver (nano scaled particles of silver) film as a touch electrode of a touch substrate is challenging.

For example, after a touch electrode is prepared using the nano-silver film, due to the poor visibility of the nano-silver pattern, the subsequent processing cannot make use of the nano-silver pattern for alignment, resulting in alignment deviation.

In addition, after the touch electrode is prepared using the nano-silver film, the etching selectivity of the nano-silver is inferior and the acidic or alkaline etching liquid in the subsequent processing may damage the conductivity of the nano-silver and adversely affect the touch function of the touch substrate.

To at least partially address the above issues, the embodiments of the present disclosure provide a touch substrate, a method for fabricating the same, and a touch display device, which can provide a flexible touch substrate using nano-silver and a photolithography process.

An embodiment of the disclosure provides a touch substrate, including: a base substrate, a touch region disposed on the base substrate including a touch electrode made of nano-silver, the touch electrode including first touch electrodes arranged along a first direction and second touch electrodes arranged along a second direction, the first direction intersecting the second direction;

a first insulating layer on a side of the first touch electrode away from a center of the base substrate, a touch electrode bridge on the first insulating layer, the touch electrode bridge connecting adjacent first touch electrodes and/or the second touch electrode via through-holes penetrating the first insulating layer. The etching liquid applied to the touch electrode bridge is different from the etching liquid applied to the nano-silver.

In this embodiment, after the touch electrode is formed, a first insulating layer covering the touch electrode is formed, and the first insulating layer can protect the touch electrode in a subsequent process. Subsequently, when the touch electrode bridge is formed, the etching liquid applied to the touch electrode bridge is different from the etching liquid applied to the nano-silver, so that the etching liquid used for etching the touch electrode bridge does not damage the touch electrode, and can maintain the conductive performance of the touch electrode and the touch substrate. The touch substrate may include the touch electrode. In this embodiment, the touch electrode is made of nano-silver, which exhibits increased flexibility. Thus, the nano-silver allows formation of a flexible touch substrate with a multi-layer structure. In this embodiment, the base substrate may be made of an insulating material such as glass.

The touch electrode may include a plurality of first touch electrodes that are independent of each other and insulated from each other, and a plurality of second touch electrodes that are independent of each other and insulated from each other. The touch electrode bridge may include a first touch electrode bridge and a second touch electrode bridge, wherein the first touch electrode bridge connects to the adjacent first touch electrode by way of a first through-hole penetrating the first insulating layer, and the second touch electrode bridge connects to the adjacent second touch electrode via a second through-hole penetrating the first insulating layer. Since the first touch electrode and the second touch electrode are independent of each other, the bendability and flexibility of the touch substrate can be improved when the touch substrate is a flexible touch substrate.

In another embodiment, the adjacent first touch electrodes arranged along a first direction may be connected with each other, and the adjacent second touch electrodes arranged along the second direction may be in contact with each other. The control electrode bridge may connect the adjacent second touch electrodes via the through-holes of the first insulating layer, so that the touch substrate is a flexible touch substrate. Optionally, the touch substrate of this embodiment further includes a conductive trace located in the routing area of the base substrate, and an insulating pattern on a side of the conductive traces facing away from a center of the base substrate, wherein the insulating pattern is located between the first insulating layer and the substrate, and the trace area is located in the surroundings of the touch area.

The conductive traces are located in the trace area of the base substrate and can remove static electricity accumulated on the base substrate, thereby increasing the anti-ESD (electrostatic discharge) capability of the touch substrate. In addition, the conductive traces are covered with an insulating pattern, and the insulating pattern can protect the conductive traces from being affected in subsequent processes.

Optionally, the conductive traces may be disposed in the same material as the touch electrodes. In this way, the conductive traces and the touch electrodes may be simultaneously formed by using the same patterning process, and the conductive traces are not required to be formed by an additional patterning process, which can reduce the number of patterning processes for fabricating the touch substrate and reduce the manufacturing cost of the touch substrate.

Optionally, the touch substrate of this embodiment may further includes a touch signal line connected to the touch electrode bridge on the first insulating layer and a second insulating layer on a side of the touch signal line away from the substrate.

In the touch substrate of the embodiment, the insulating pattern may be consistent with the pattern of the second insulating layer such that the same mask can be used to fabricate the insulating pattern and the second insulating layer without a requirement for a specialized mask for the insulating pattern. In the touch substrate of the embodiment, the substrate may be a flexible substrate. In this embodiment, the touch electrode is made of nano-silver, which exhibits increased bendability (flexibility). By patterning the substrate with a grid-like array of first electrodes and second electrodes, a mutual-capacitive touch display may be fabricated.

In this way, a flexible, touch substrate with a multi-layer structure may be fabricated with nano-silver.

The embodiment of the disclosure further provides a touch display device comprising the touch substrate as described above. The touch display device may be any product or component having a display function, such as a television, a display, a digital photo display, a mobile phone, a tablet computer, etc., wherein the display device further includes a flexible circuit board, a printed circuit board, and a backboard. By fabricating a mutual-capacitive touch display, multiple points of touch on a display fabricated with the touch substrate may be supported.

The embodiment of the disclosure further provides a method for manufacturing a touch substrate, comprising providing a base substrate, forming a nano-silver layer on the base substrate, patterning the nano-silver layer by a photolithography process, and forming a touch electrode in a touch area of the base substrate. The touch electrode may include a first touch electrode arranged along a first direction and a second touch electrode arranged along the second direction, wherein the first direction intersects the second direction. Furthermore, the method may include forming a first insulating layer, and forming a touch electrode bridge on the first insulating layer by using a photolithography process, wherein the touch electrode bridge connects adjacent first touch electrodes and/or adjacent second touch electrodes by way of a first through-hole penetrating the first insulating layer nano-silver. In this embodiment, after the touch electrode is formed, a first insulating layer covering the touch electrode is formed, and the first insulating layer can protect the touch electrode in subsequent processes, and subsequently, such as when the touch electrode bridge is formed. The etching liquid applied to the touch electrode bridge is different from the etching liquid applied to the nano-silver so that the etching liquid used for etching the touch electrode bridge does not damage the touch electrode, thereby ensuring the conductive performance of the touch electrode and the performance of the touch substrate is maintained. In this embodiment, the touch electrode is made of nano-silver, which exhibits increased flexibility and bendability. The touch electrode may include a plurality of first touch electrodes that are independent of each other and insulated from each other, and a plurality of second touch electrodes that are independent of each other and insulated from each other. Since the first touch electrode and the second touch electrode are independent of each other, bendability and flexibility of the touch substrate the touch substrate can be improved.

In another embodiment, the adjacent first touch electrodes arranged along the first direction may be connected, and the adjacent second touch electrodes arranged along the second direction may be independent of each other and in contact with each other. The touch electrode bridge connects the adjacent second touch electrodes via the through-holes of the first insulating layer such that the touch substrate has a good flexibility in both the first direction and the second direction.

Since the visibility of the nano-silver is poor, it might be difficult to align the nano-silver pattern, and the photolithography process may not be performed. In this embodiment, an alignment mark is additionally formed in the peripheral region of the base substrate, so that the lithography process may be aligned by using the alignment mark facilitating patterning of the nano-silver by a photolithography process to form a touch electrode. In one example, the alignment mark may be formed in the peripheral region and the insulating pattern can be formed in the trace area by the same patterning process which can lower the number of patterning processes for fabricating the touch substrate. In another example, the insulating pattern and the alignment mark may also be produced separately by two patterning processes.

Figure 13:
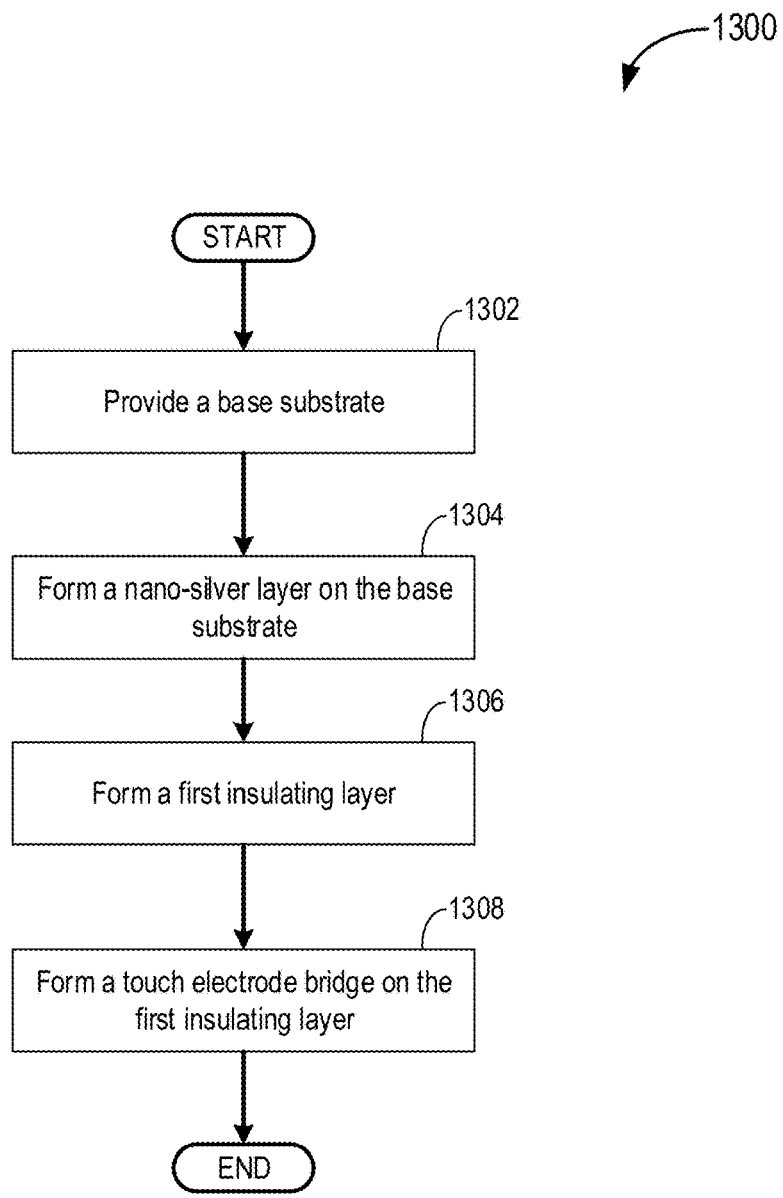
FIGS. 13 and 14 show flow charts of an example method for fabrication of a flexible touch substrate using nano-scaled silver wires.

FIG. 13 shows an example method 1300 for manufacturing a touch substrate. At 1302, a base substrate may be provided. The base substrate may be formed of a flexible material. At 1304, a nano-silver layer may be formed on the base substrate, the nano-silver layer may be patterned by a photolithography process to form a touch electrode in a touch area of the base substrate, the touch electrode including a first touch electrode arranged along a first direction and a second touch electrode arranged along a second direction, the first direction intersecting the second direction. After forming of the nano-silver layer on the base substrate and prior to the patterning the nano-silver layer, an insulating pattern may be formed on a trace area of the base substrate, the trace area located at a periphery of the touch area and the insulating pattern is located on the nano-silver layer of the trace area. The patterning of the nano-silver layer by the photolithography process may include patterning a portion of the nano-silver layer not covered by the insulating pattern. During forming of the insulating pattern, an alignment mark may be formed on a peripheral region of the base substrate, the peripheral region located at a periphery of the trace area.

Figure 2:
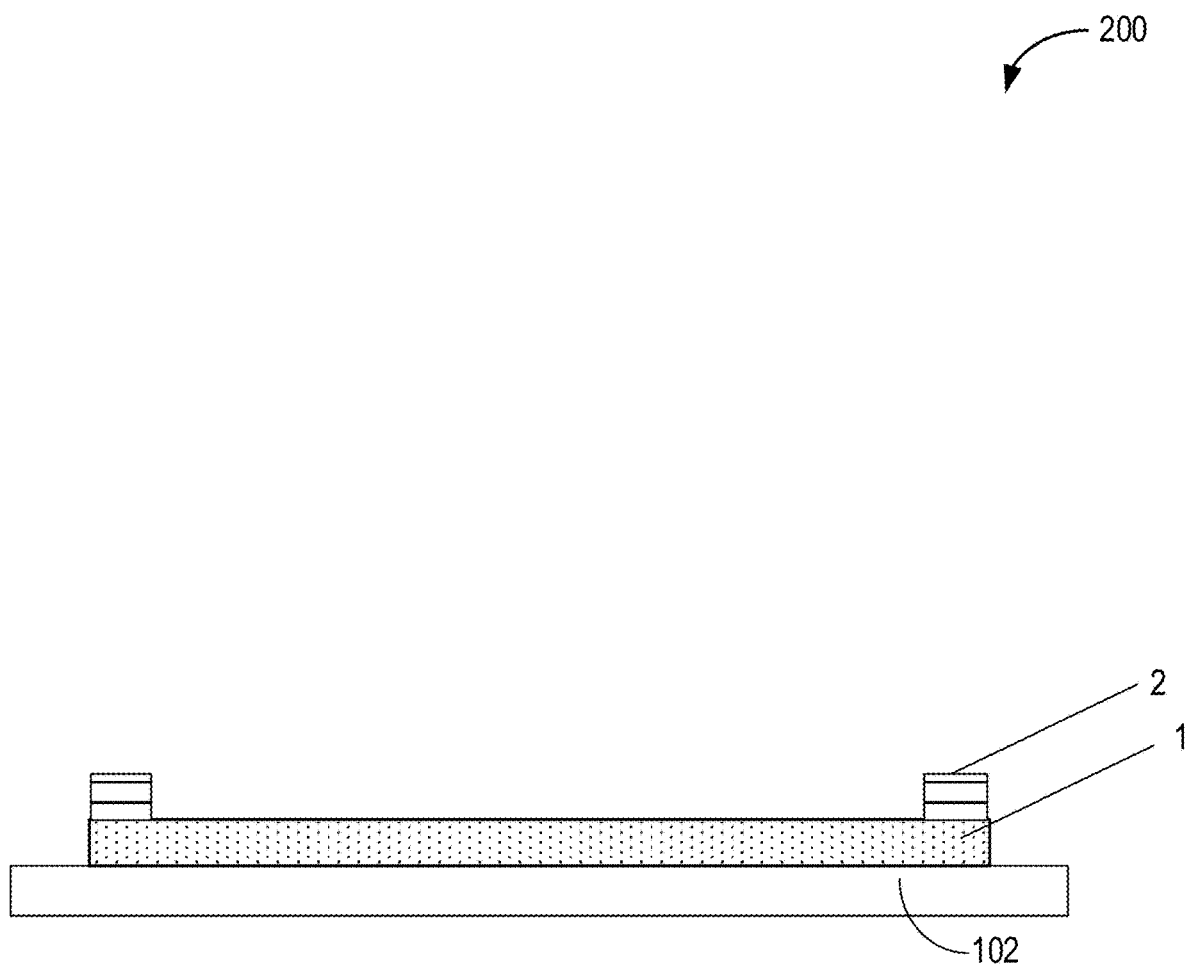
FIG. 2 is a schematic cross-sectional view of the substrate of FIG. 1 taken along line AB.
Figure 14:
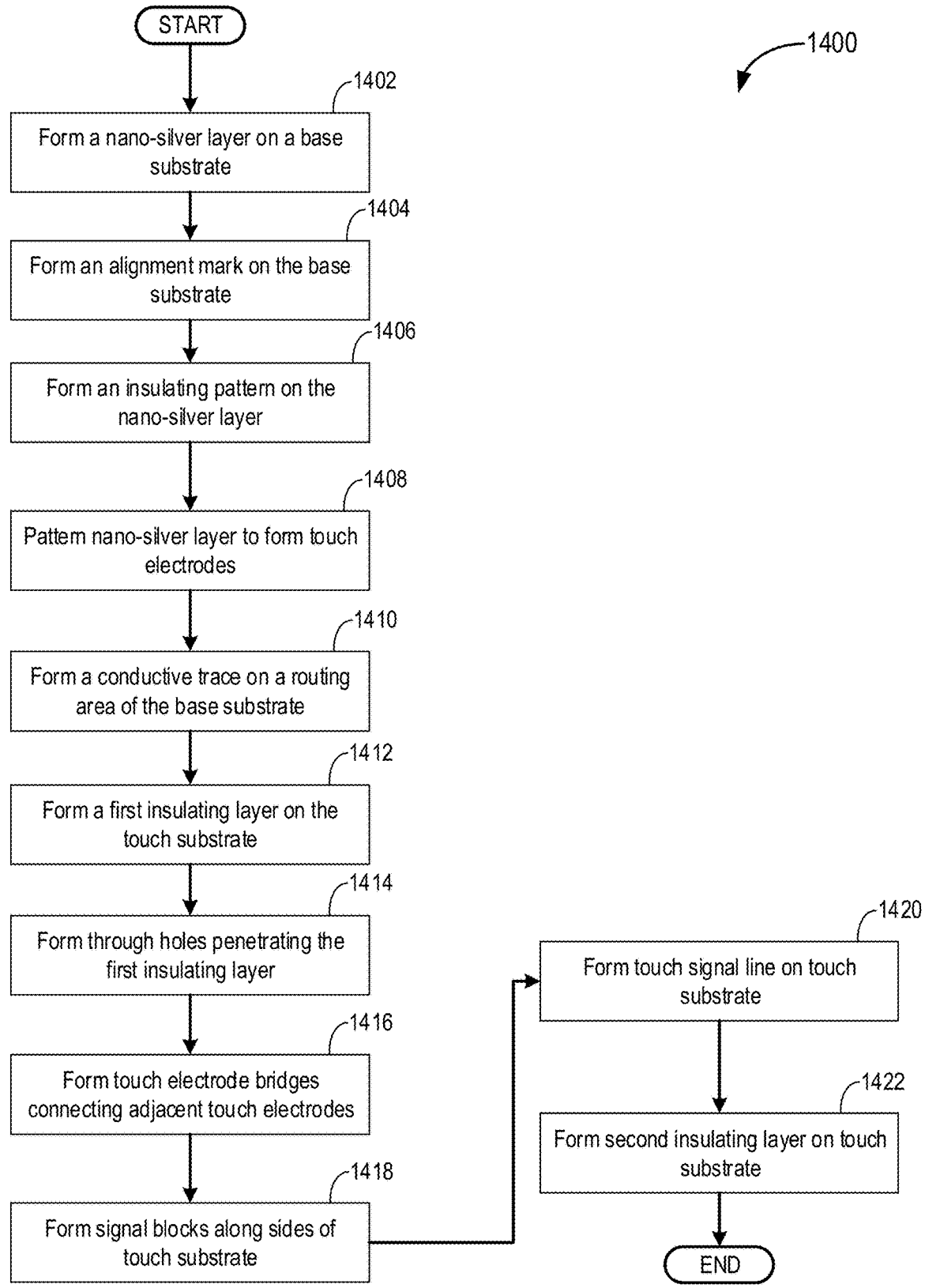

At 1306, a first insulating layer may be formed on the base substrate including the nano-silver patterns. At 1308, a touch electrode bridge may be formed on the first insulating layer by using a photolithography process. The touch electrode bridge may connect adjacent first touch electrode and/or the second touch electrode by way of a first through-hole penetrating the first insulating layer. An etching liquid applied to the touch electrode bridge may be different from an etching liquid applied to the nano-silver. After forming of the touch electrode bridge on the first insulating layer by using the photolithography process, a touch signal line connected to the touch electrode bridge may be formed and a second insulating layer covering the touch signal line may also be formed. The insulating pattern and the second insulating layer may be formed by using a same mask. Details of the method for fabrication of a flexible touch electrode using nano-silver particles is described in relation to FIG. 14.

a. FIG. 14 shows a detailed example method 1400 for fabrication of a flexible touch substrate using nano-scaled silver particles or wires. At 1402, a layer of nano-silver particles or wire, wherein a size of each particle of silver is in the nanometer range or a diameter of each wire is in the nanometer range, may be formed on a flexible base substrate. The formation of the nano-silver layer is described herein with reference to FIGS. 1 and 2.

b. FIG. 1 shows a schematic of a top-view 100 of the substrate and FIG. 2 shows a cross-sectional view 200 of the substrate in the X-Z plane. As shown in FIGS. 1 and 2, a nano-silver layer 1, may be formed on a base substrate 102. The base substrate 102 may be a flexible substrate such as a polyimide film.

A layer of nano-silver may be coated on the base substrate. A nano-silver solution may comprise an organic solvent and nano-silver doped in the organic solvent. The nano-silver solution, upon solidifying on the base substrate 102 may form a nano-silver layer 1. The nano-silver layer 1 comprises a plurality of silver nanowires formed in the organic insulating layer (solution). Curing methods for the nano-silver layer may include, but are not limited to, heat curing, ultraviolet curing, and other curing processes. The coating of the nano-silver layer forms a touch area on the base substrate, henceforth also referred as touch substrate or touch area.

The visibility of the nano-silver layer 1 may be inferior relative to other materials such as indium tin oxide. After the formation of the nano-silver layer 1, it may be difficult to distinguish the boundary of the nano-silver layer 1 making it difficult to perform alignment of the formed nano-silver layer and to perform the photolithography process. At 1404, an alignment mark 8 may be formed on the base substrate. As shown in FIG. 1, the alignment mark 8 may be located in the peripheral region of the base substrate (not coated with nano-silver), making the boundary of the nano-silver layer identifiable such that during a subsequent photolithography processing, alignment of photolithography setup may be performed by using the alignment mark 8. The shape of the alignment mark 8 is not limited, and may include having a shape of a long strip, a cross, or any other shape. In this embodiment, as shown in FIG. 1, the alignment mark 8 may have a cross shape. It should be noted that the alignment mark 8 is only used in the manufacturing process of the touch substrate. After the touch substrate is used for fabricating a mother board, the alignment mark 8 may not be retained on the touch substrate and may be removed by cutting a portion of the touch substrate containing the alignment mark 8.

At 1406, an insulating pattern (layer) may be formed on the nano-silver layer. As further described with reference to FIGS. 1 and 2, a transparent insulating material is coated on the nano-silver layer 1, and the transparent insulating material is patterned to form an insulating pattern 2. The insulating layer may be annular, covering the peripheral area of the substrate. The insulating pattern 2 may overlap with the nano-silver layer 1 along the perimeter of the base substrate 102.

In order to reduce the number of patterning processes for the touch substrate, in one example, the insulating pattern 2 and the alignment mark 8 may be simultaneously formed of the same material by one patterning process. In one example, the insulating pattern 2 and the alignment mark 8 may be made of a low temperature curing organic coating film. In another example, the insulating pattern 2 and the alignment mark 8 may be respectively formed by two patterning processes. The insulating pattern 2 and the alignment mark 8 may also be made of different materials. Since the insulating pattern 2 needs to be retained on the prepared touch substrate, the insulating pattern 2 needs to be transparent. However, since the alignment mark is no longer retained on the prepared touch substrate, the alignment mark 8 may be opaque.

Figure 3:
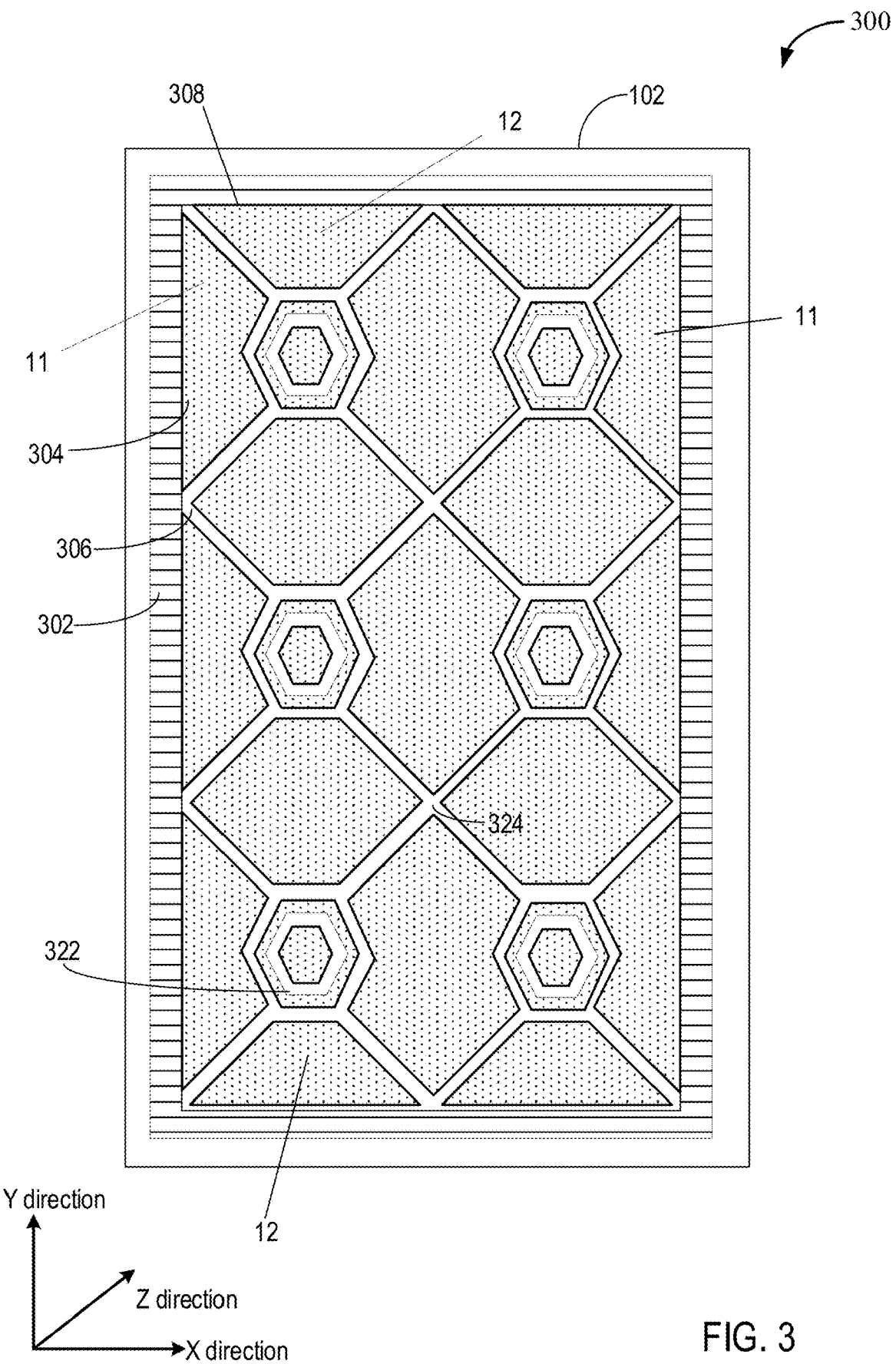
FIG. 3 is a schematic diagram of forming a first touch electrode and a second touch electrode on a substrate according to an embodiment of the present disclosure.
Figure 4:
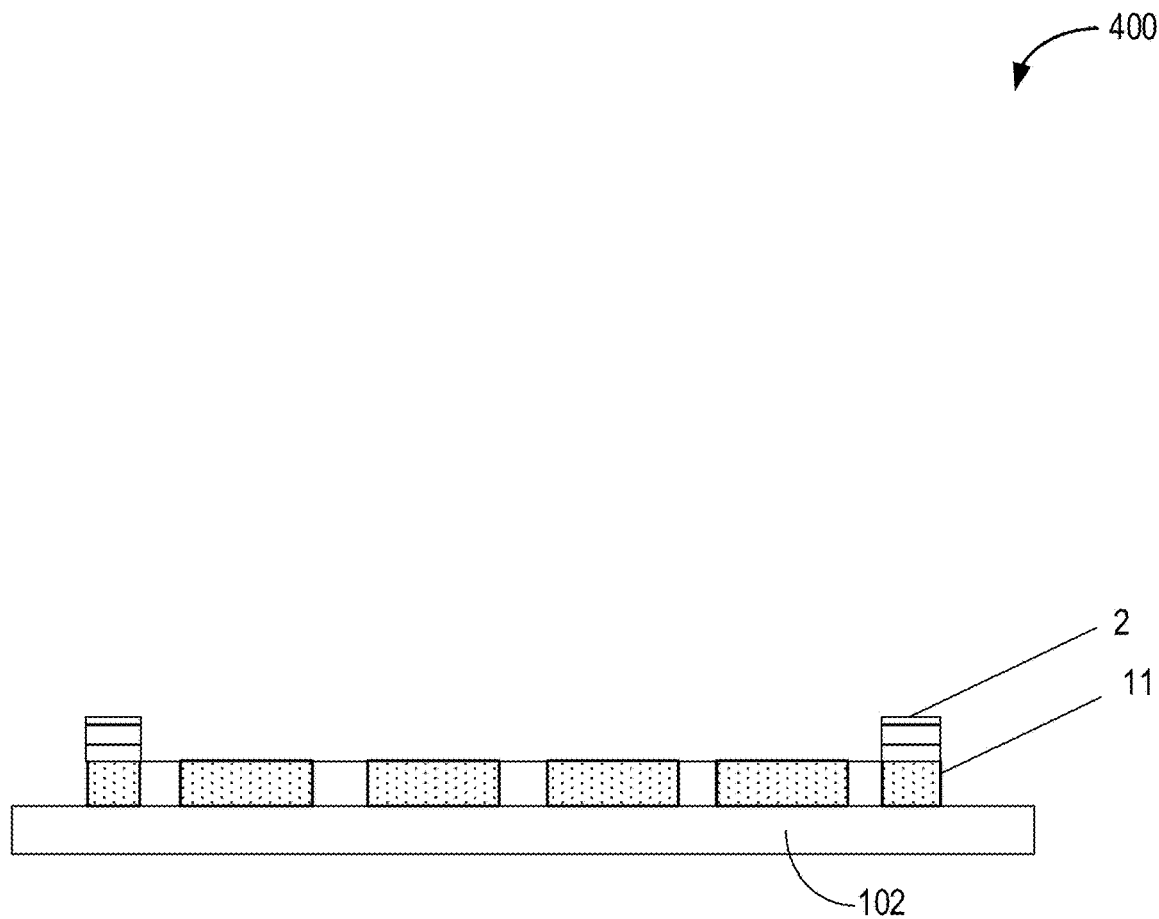
FIG. 4 is a schematic cross-sectional view of the substrate of FIG. 3.

At 1408, the nano-silver layer of the touch area may be patterned to form touch electrodes. The formation of the touch electrodes is further described with reference to FIGS. 3 and 4. FIG. 3 shows a schematic of a top-view 300 of the substrate with the touch electrodes and FIG. 4 shows a cross-sectional view 400 of the substrate (taken in the in the X-Z plane) with the touch electrodes.

A photoresist may be coated on the nano-silver layer 1, and the photoresist may be exposed by using a mask to form a photoresist retention region and a photoresist removal region, wherein the photoresist retention region corresponds to the region where the touch electrode is formed. The nano-silver layer 1 in the photoresist removal region may be etched away and the remaining photoresist may be peeled off to form a pattern of the touch electrode. The touch electrodes include a first touch electrode 11 arranged along the X direction ($1^{st}$ direction) and a second touch electrode 12 arranged along the Y direction ($2^{nd}$ direction). The X direction intersects the Y direction and, in the example of FIG. 3, the two directions are mutually perpendicular. The adjacent touch electrodes may be insulated from each other. It is worth noting that the nano-silver in the photoresist removal area is removed, but the organic insulating layer is retained. The area of the nano-silver layer covered by the touch electrodes (both the first touch electrodes 11 and the second touch electrodes 12) may constitute a touch area 304 and the insulating regions separating adjacent electrodes may constitute an insulating area 306.

The first touch electrode 11 may include a plurality of (repeated) first touch electrodes 11 arranged along the X direction. The second touch electrode 12 may include a plurality of (repeated) second touch electrodes 12 arranged along the Y direction. Two adjacent first touch electrodes 11 and two adjacent second touch electrodes 12 may be separated by a hexagonal pattern 322. Each hexagonal pattern 322 may include alternating regions of touch area and insulating area. As an example, the hexagonal pattern 322 may include concentric hexagonal regions of alternating touch area and insulating area. The insulating areas 306 between the first electrodes 11 and the second electrodes 12 may form lines that run at a 45° angle (diagonal) relative to the X direction from one side of the substrate to another (adjacent or opposite) side of the substrate. Two insulating area lines may cross each other at a junction 324 or at a hexagonal pattern 322. The application is not limited to the shapes depicted in the figures and described in the embodiments. The specific shapes are described for purposes of explanation of the configuration. Other suitable shapes such as octagons may also be used.

A routing area 302 may be formed around the touch area 304 and insulating area 306. The routing area 302 may also be formed around the touch region 308 which comprises the overall area occupied by touch areas 304 separated by insulating area 306. The touch region may include the area on the substrate with touch functionality. The nano-silver layer covered by the insulating pattern 2 is retained on the base substrate.

Returning to FIG. 14, at 1410, an annular conductive trace can be formed in the routing area. The routing area 302 including the conductive trace may be termed as a trace area. The conductive trace may be disposed around the touch area, and can conduct away the accumulated static electricity of the touch substrate, thereby improving the anti-ESD (electro static discharge) capability of the touch substrate. Conductive traces may be formed of metallic materials, such as copper, or other conductive materials.

Figure 5:
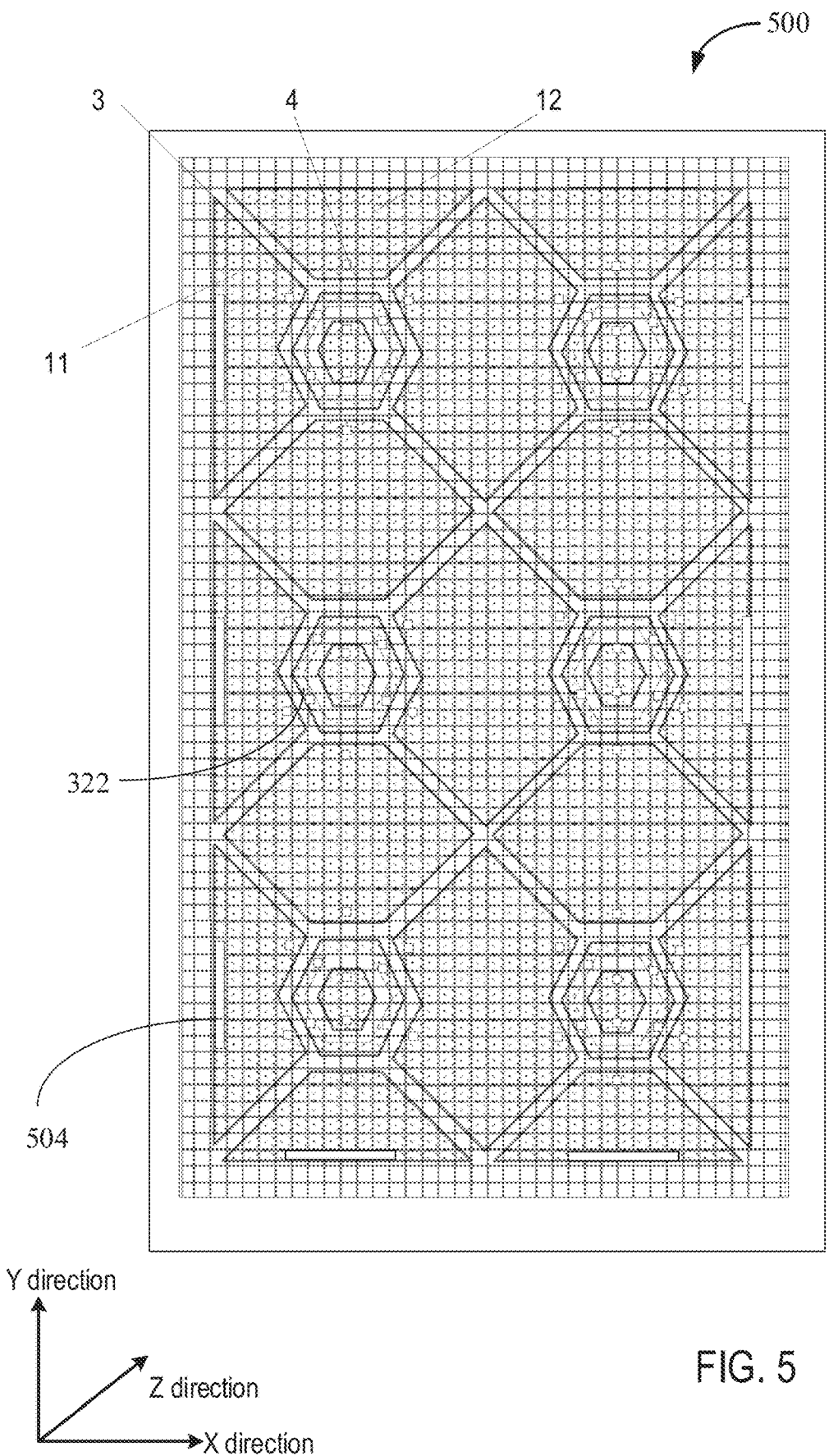
FIG. 5 is a schematic view of a first insulating layer on a substrate according to an embodiment of the present disclosure.
Figure 6:
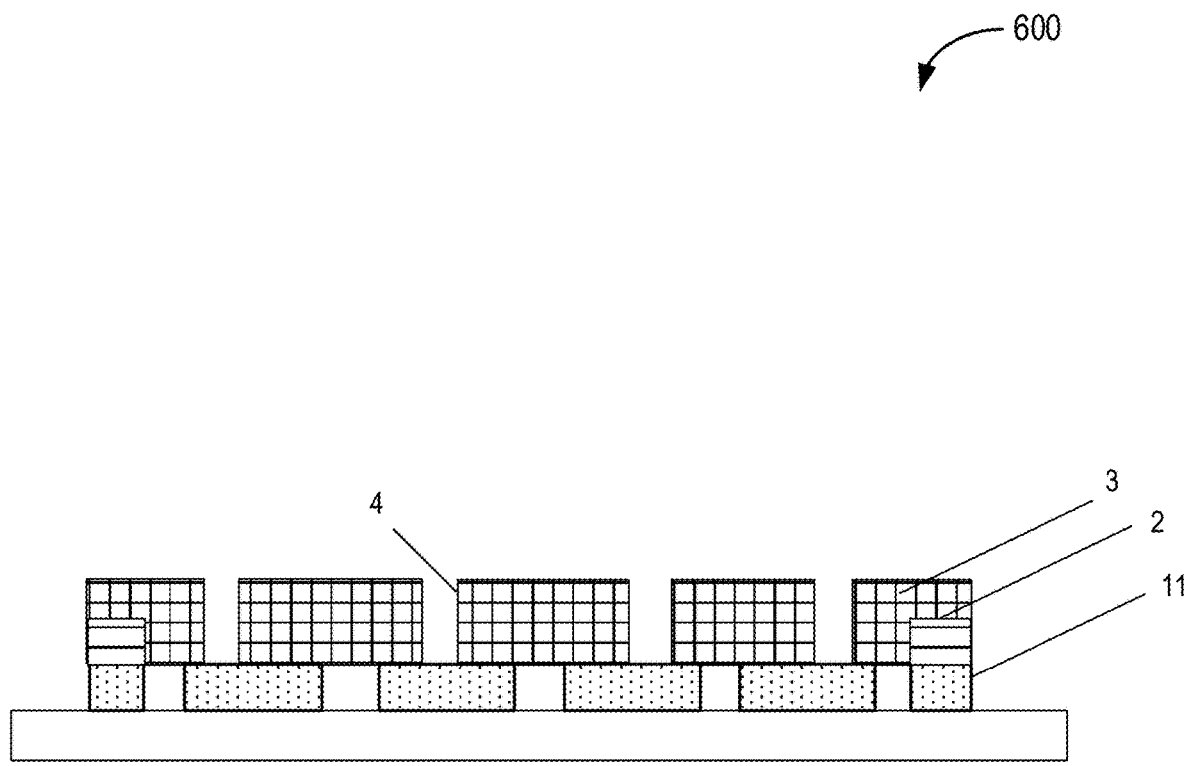
FIG. 6 is a schematic cross-sectional view of the substrate of FIG. 5.

At 1412 a first insulating layer may be formed on the touch electrode. The formation of the first insulating layer is further described herein with reference to FIGS. 5 and 6. FIG. 5 shows a schematic of a top-view 500 of the substrate with the touch electrodes and the first insulating layer and FIG. 6 shows a cross-sectional view 600 of the substrate (taken in the in the X-Z plane) with the touch electrodes and the first insulating layer 3.

The entire first insulating layer 3 may be prepared on the touch substrate. The first insulating layer 3 covers the touch area and the routing area to protect the touch electrodes in subsequent processes. Insulating layers may be formed of many types of insulating materials, such as epoxies, and formed by many types of deposition processes.

At 1414, the first insulating layer 3 is patterned to form a plurality of through-holes penetrating the first insulating layer. The through holes 4 may be formed via exposure and development. As shown in FIG. 5, the through-holes 4 may be arranged around and within the hexagonal patterns 322. The holes may be arranged with axial symmetry or central symmetry.

At 1416, a touch electrode bridge 5 may be formed joining the touch electrodes. The formation of the touch electrode bridge is further described with reference to FIGS. 7 and 8.

Figure 7:
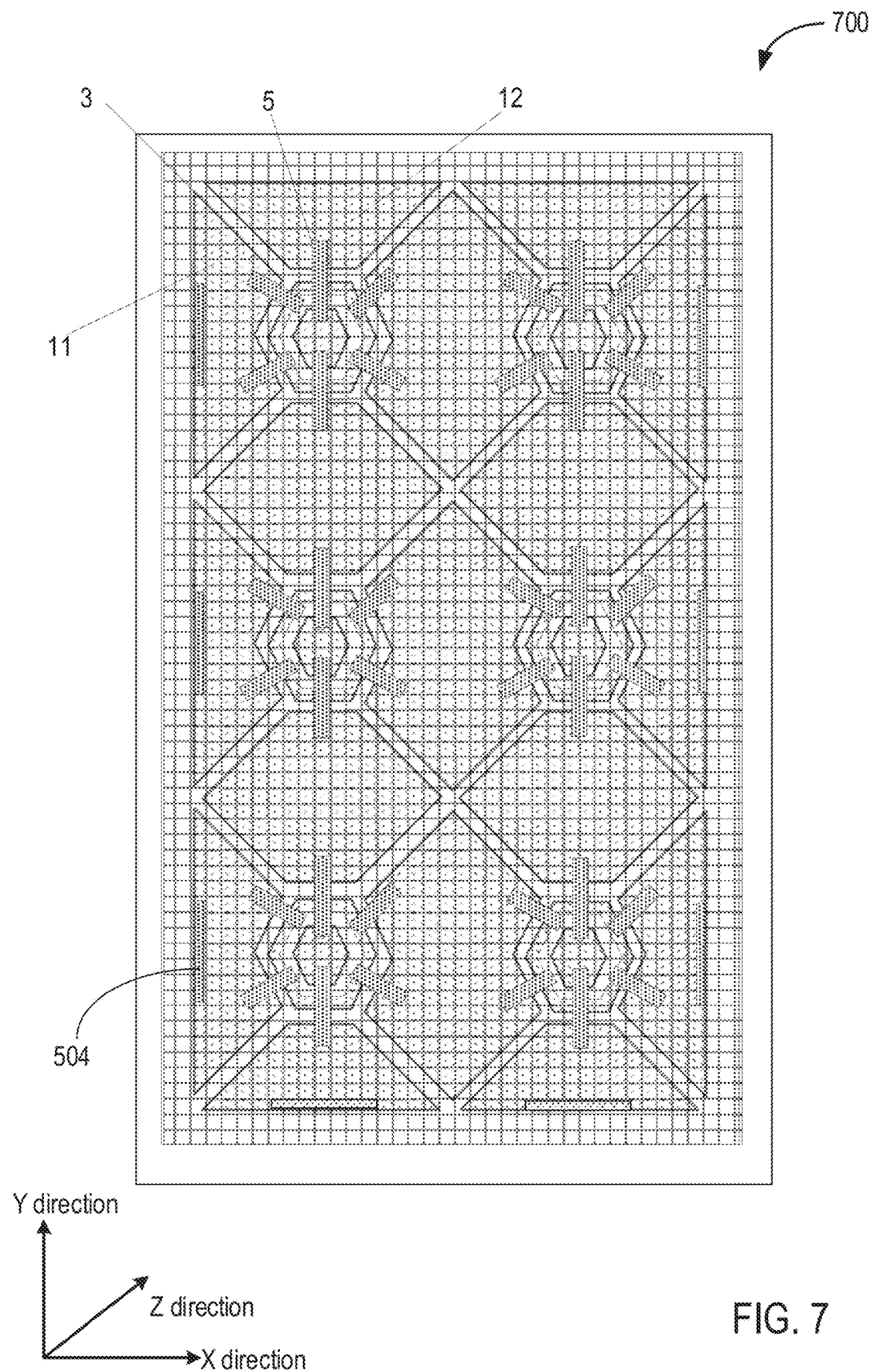
FIG. 7 is a schematic diagram of a touch electrode bridge after forming a bridge on a substrate according to an embodiment of the present disclosure.
Figure 8:
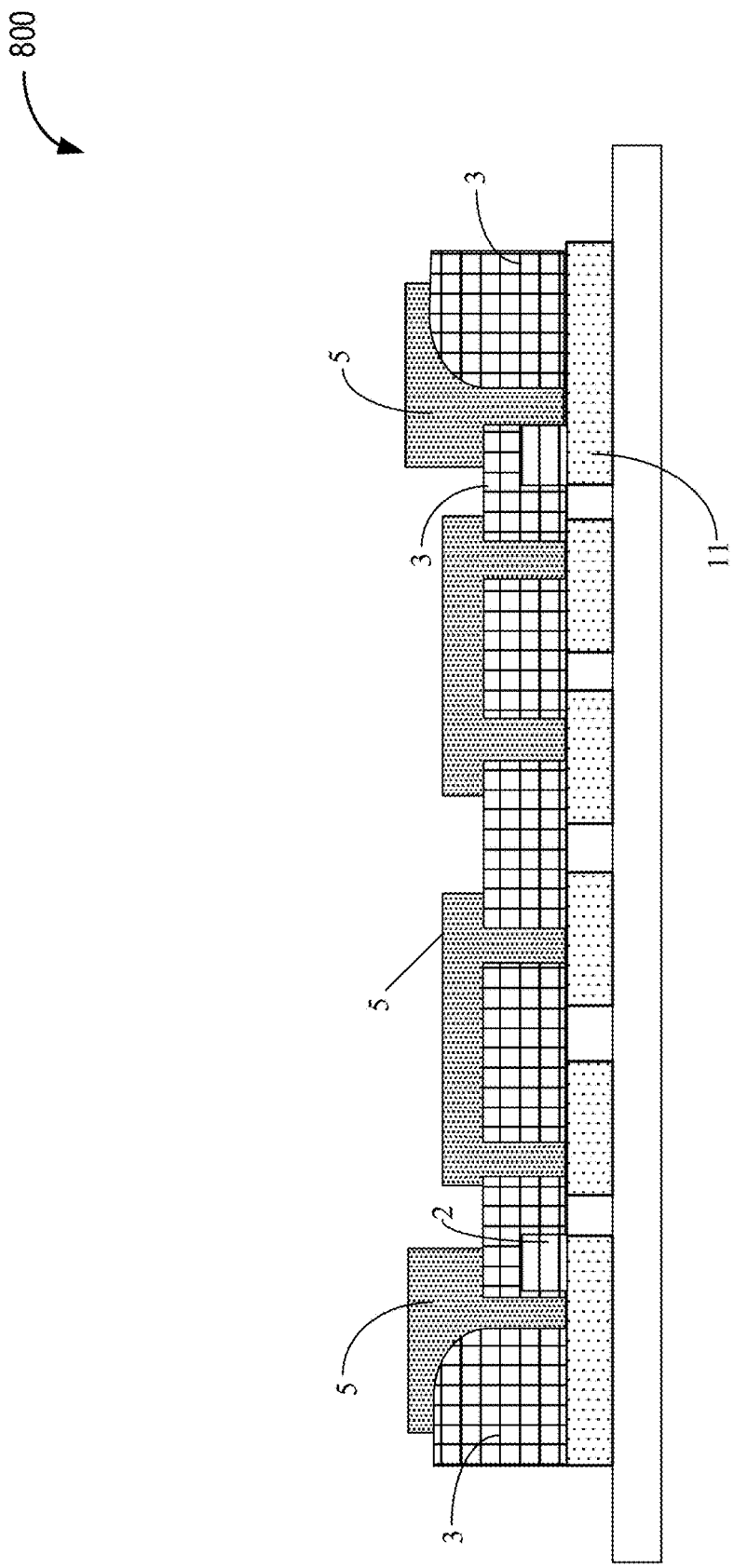
FIG. 8 is a schematic cross-sectional view of the substrate of FIG. 7.

FIG. 7 shows a schematic of a top-view 700 of the substrate with the touch electrodes and the touch electrode bridge and FIG. 7 shows a cross-sectional view 700 of the substrate (taken in the in the X-Z plane) with the touch electrodes and the touch electrode bridge.

The through-holes 4 may be located at the junction of the touch electrode bridge and the touch electrodes. Said another way, each touch electrode bridge may join two or more adjacent through-holes 4.

In order to ensure that the touch electrode formed by the nano-silver layer is not damaged during the patterning process of forming the touch electrode bridge 5, and that the performance of the touch electrode is maintained, the etching liquid applied to the touch electrode bridge 5 is different from the etching liquid applied to the nano-silver layer, and the material of the touch electrode bridge 5 is not a nano-silver layer. As an example, the touch electrode bridge 5 may be made of metal or ITO.

In this example, the touch electrode bridge 5 can be fabricated using ITO. Since the bridge is made of ITO material (not flexible) the hexagon structure is designed to facilitate circuit conduction during bending.

Specifically, an ITO layer is formed on the touch area and the insulating area on the substrate, a photoresist is coated on the ITO layer, and the photoresist is exposed by a mask to form a photoresist retention region and a photoresist removal region. The touch area corresponds to the area where the touch electrode bridge is located. The ITO in the photoresist removal area is etched away, and the remaining photoresist is peeled off to form the touch electrode bridge 5. The touch electrode bridge 5 includes a first touch electrode bridge and a second touch electrode bridge, wherein the first touch electrode bridge connects to the adjacent first touch electrodes 11, and the second touch electrode bridge connects to the adjacent second touch electrodes 12.

At 1418, a signal block for inputting or outputting a touch signal can be formed in the touch area by using ITO. The signal block may also be formed during formation of the touch electrode bridge. The signal block may include a plurality of signal blocks formed along sides (periphery) of the touch substrate. The signal blocks may be formed on the first touch electrodes 11.

Figure 9:
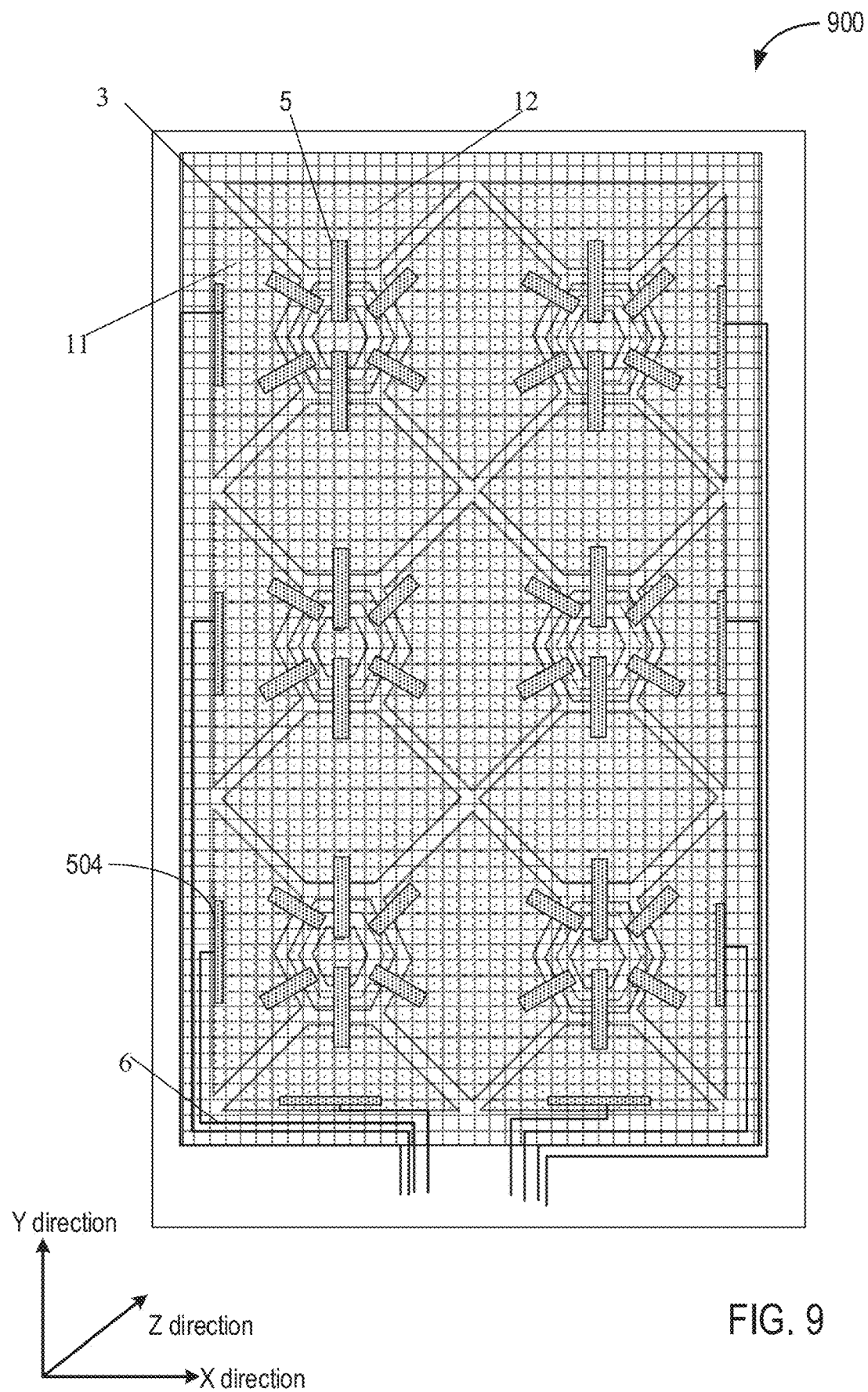
FIG. 9 is a schematic diagram of a touch signal line formed on a substrate according to an embodiment of the present disclosure.
Figure 10:
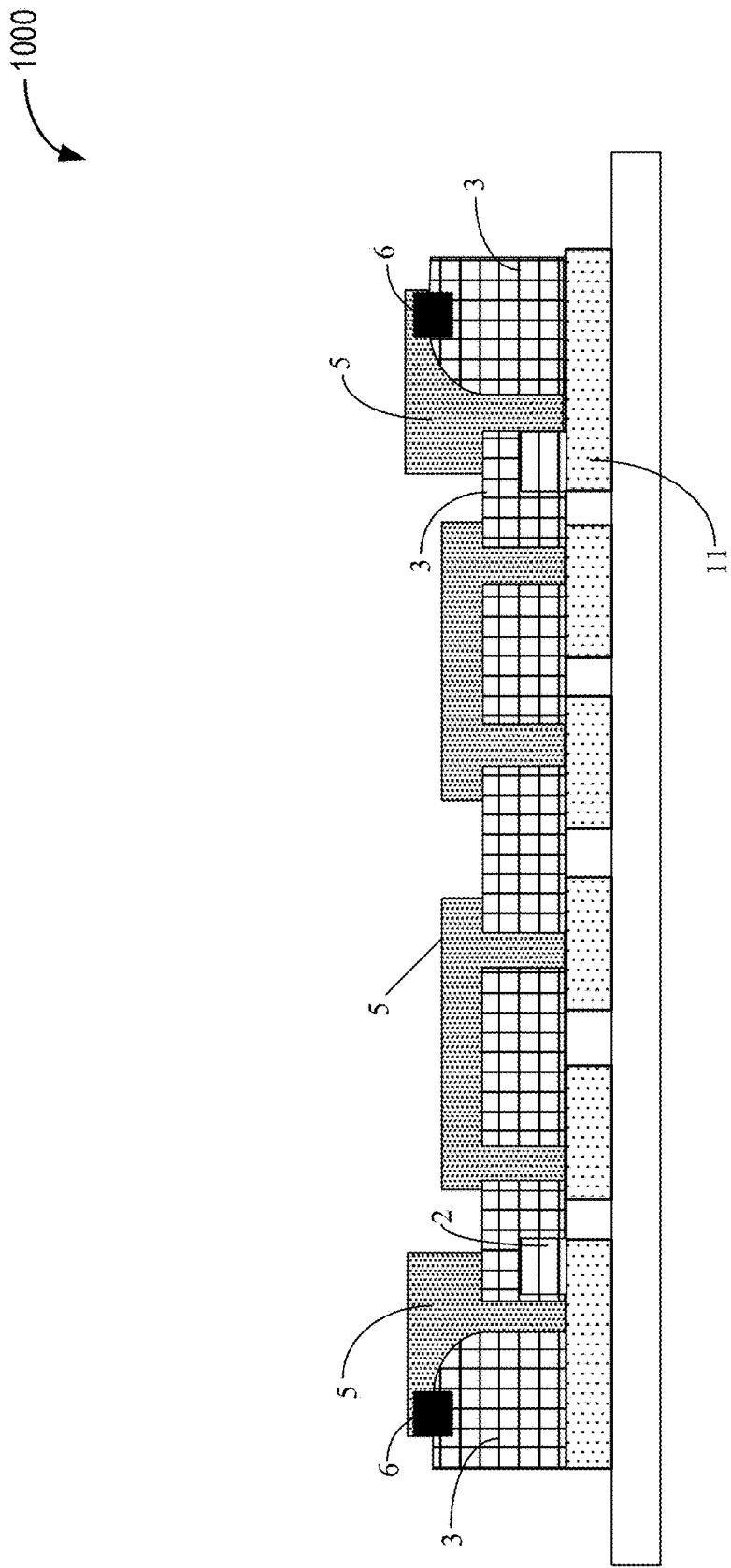
FIG. 10 is a schematic cross-sectional view of the substrate of FIG. 9.

At 1420, a touch signal line may be formed on the touch substrate. The formation of the touch signal line is further described with reference to FIGS. 9 and 10. FIG. 9 shows a schematic of a top-view 900 of the touch substrate with touch signal line and FIG. 10 shows a cross-sectional view 1000 of the touch substrate (taken in the in the X-Z plane) with the touch signal line.

A metal layer may be formed on the touch substrate, and a photoresist may be coated on the metal layer, wherein the photoresist may be exposed by the mask to form a photoresist retention region and a photoresist removal region. The photoresist retention area corresponds to the area where the touch signal line 6 is located. The metal layer of the photoresist removal area is etched away and the remaining photoresist is peeled off to obtain the touch signal line 6 located in the trace region of the routing area. The touch signal line 6 is configured to connect the interface of the touch circuit and the signal block. The touch circuit can input a touch driving signal to the first touch electrode through the signal block coupled to the first touch electrode, and receive a sensing signal from the second touch electrode through the signal block connected to the second touch electrode.

Figure 11:
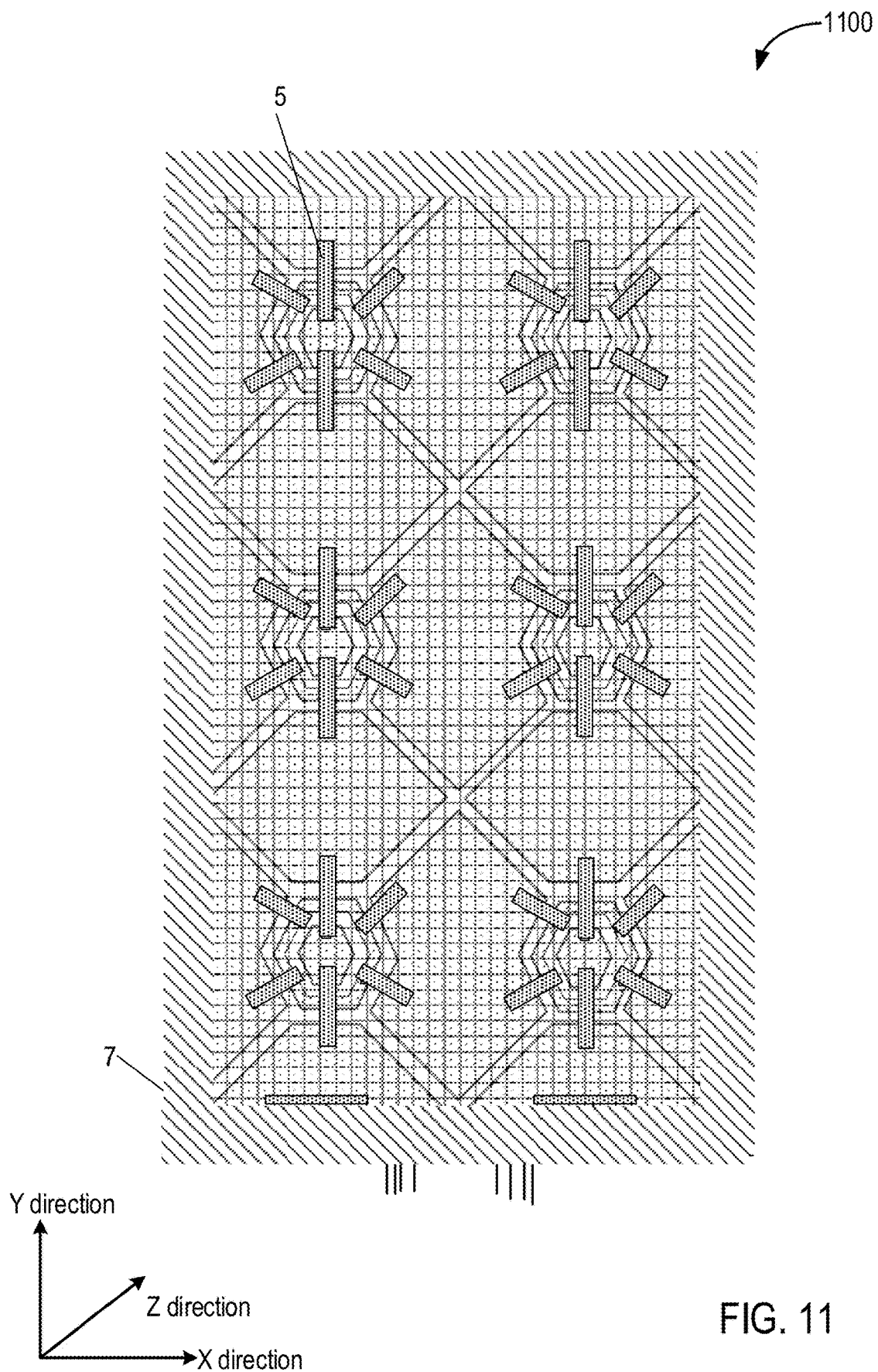
FIG. 11 is a schematic view of a second insulating layer on a substrate according to an embodiment of the present disclosure.
Figure 12:
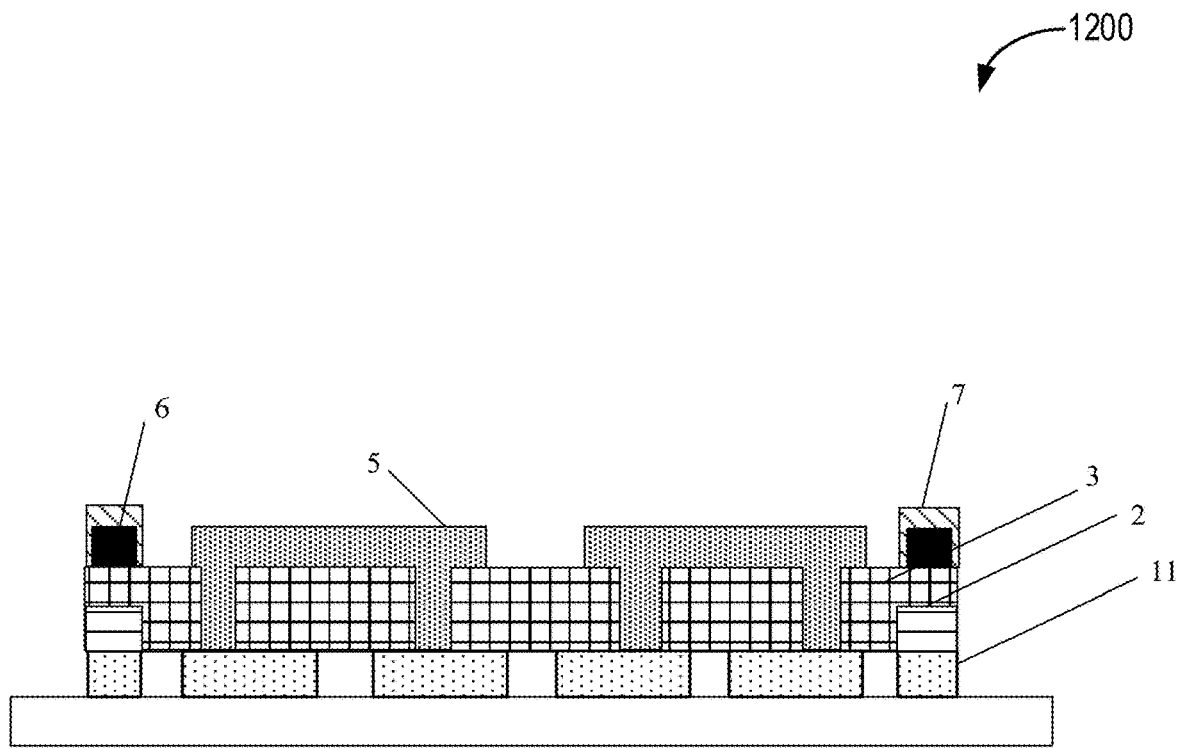
FIG. 12 is a schematic cross-sectional view of the substrate of FIG. 11

Returning to FIG. 14, at 1418, a pattern of a second insulating layer is formed on the touch substrate. The formation of the second insulating layer is further described with reference to FIGS. 11 and 12. FIG. 11 shows a schematic of a top-view 1100 of the touch substrate with the second insulating layer and FIG. 12 shows a cross-sectional view 1200 of the touch substrate (taken in the in the X-Z plane) with the second insulating layer.

After the touch signal line 6 is formed, a second insulating layer 7 covering the touch signal line 6 may be formed to protect the touch signal line 6.

In this embodiment, the pattern of the second insulating layer 7 can be consistent with the pattern of the insulating pattern 2 (as shown in FIG. 1), so that the pattern of the second insulating layer 7 and the insulating pattern 2 can be formed by using the same mask, and the number of masks can be saved, thereby reducing the production cost of the touch substrate.

In this embodiment, after the touch electrode is formed, a first insulating layer covering the touch electrode is formed, which can protect the touch electrode in a subsequent process, and then the touch electrode bridge is formed. The etching liquid applied to the electrode bridge is different from the etching liquid applied to the nano-silver of the touch electrodes, so that the etching liquid used for etching the touch electrode bridge does not damage the touch electrode, and the touch property of the nano-silver electrodes can be preserved. The performance of the touch substrate relies on the conductive properties of the electrodes. In this embodiment, the touch electrodes are made of nano-silver, which exhibits increased flexibility and bendability. The technical effect of the embodiment includes fabrication of a flexible touch substrate of a multilayer structure with nano-silver.

In the method embodiments of the present disclosure, the sequence numbers of the steps are examples and do not limit the sequence of the method steps. Those skilled in the art may alter the sequence of the steps, and any change in the sequence of steps also falls within the scope of the disclosure.

Figure 15:
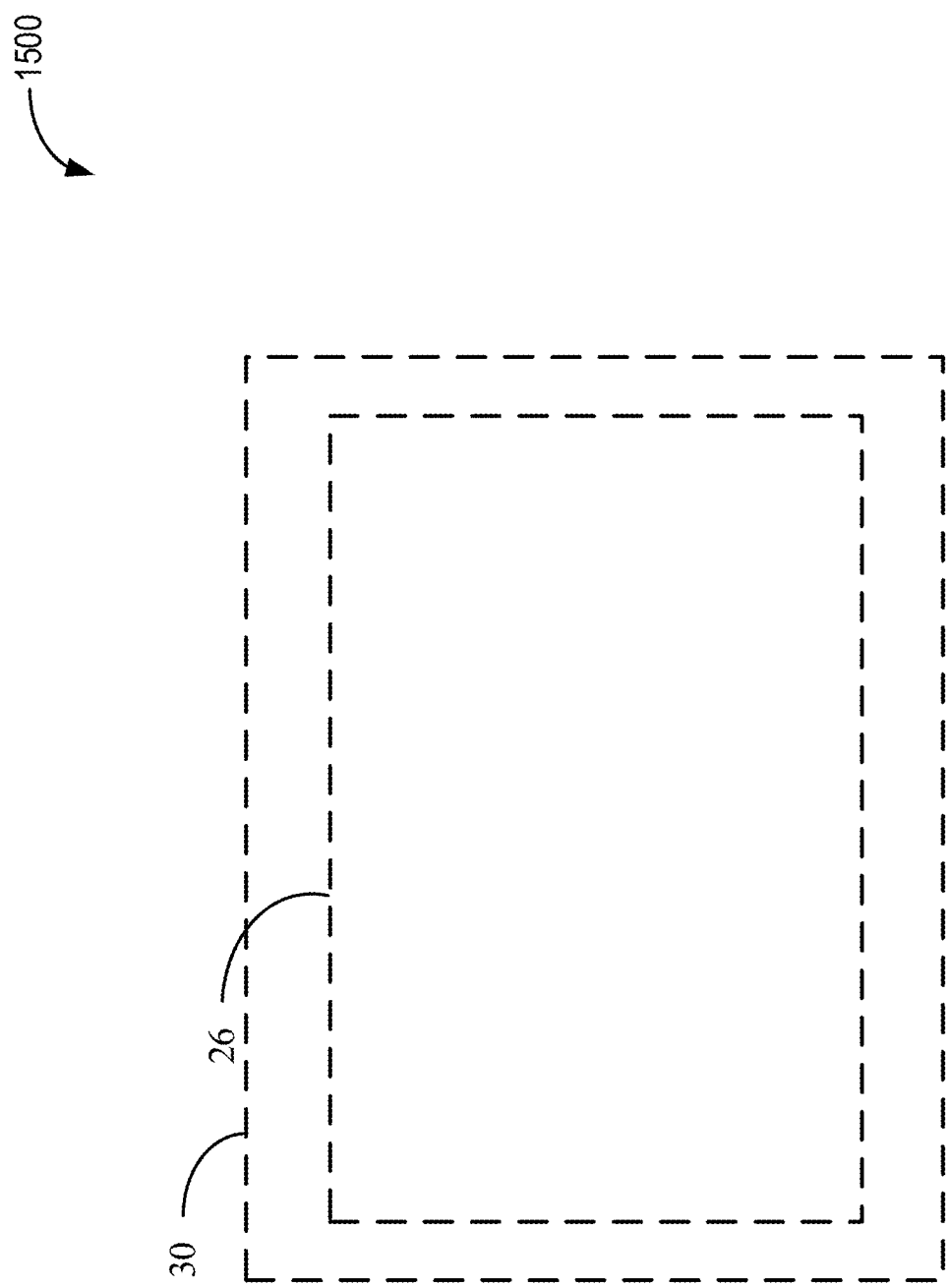
FIG. 15 shows a schematic structural diagram of a display device according to an embodiment of the present disclosure.

Further, and as will be described below with reference to FIG. 15, a display device is provided by an embodiment of the present disclosure, which may include a touch substrate of the above embodiment. Referring now to FIG. 15, a schematic structural diagram 1500 depicts a touch display device 30 including the display panel 26. The display panel may be a flexible display panel including the touch substrate of FIG. 12.

It will be appreciated that the display device 30 of this embodiment may be any product or component having a display function, such as an electronic paper, a mobile phone, a tablet computer, a television, a notebook computer, a digital photo frame, a navigator (e.g., a global positioning system), etc.

Unless otherwise defined, technical terms or scientific terms used in the present disclosure are intended to be in the ordinary meaning of those of ordinary skill in the art. The words "first," "second," and similar terms used in the present disclosure do not denote any order, quantity, or importance, but are used to distinguish different components. The word "comprising" or "comprises" or the like means that the element or item preceding the word is intended to be in the words "connected" or "connected" and the like are not limited to physical or mechanical connections, but may include electrical connections, whether direct or indirect. "Upper", "lower", "left", "right", etc. are only used to indicate the relative positional relationship, and when the absolute position of the object to be described is changed, the relative positional relationship may also change accordingly.

It will be understood that when an element such as a layer, a film, a region or a substrate is referred to as being "on" or "lower" Or there may be intermediate elements.

The above is a preferred embodiment of the present disclosure, and it should be noted that those skilled in the art can also make several improvements and retouchings without departing from the principles of the present disclosure. It should be considered as the scope of protection of the present disclosure.

It is to be understood that the above embodiments are merely exemplary embodiments employed to explain the principles of the inventive concepts, but the inventive concepts are not limited thereto. Various modifications and improvements can be made by those skilled in the art without departing from the spirit and scope of the disclosure, and such modifications and improvements are also considered to be within the scope of the disclosure.

The invention claimed is:

1. A method of manufacturing a touch substrate, comprising:
forming a base substrate;
forming an insulating pattern on a trace region of the base substrate, the trace area located at a periphery of a touch area of the base substrate,
forming a touch electrode made of nano-silver in the touch area without the insulating pattern, the touch electrode including first touch electrodes arranged along a first direction and second touch electrodes arranged along a second direction, the first direction intersecting the second direction;
forming a first insulating layer on a side of the touch electrode away from a center of the base substrate;
forming a touch electrode bridge on the first insulating layer, the touch electrode bridge connecting at least one of the first touch electrodes and the second touch electrodes by way of through-holes penetrating the first insulating layer, and
etching the touch electrode bridge with a first etching liquid different from a second etching liquid-applied to the nano-silver.

2. The method of claim 1 further comprising:
forming a conductive trace located in a routing area of the base substrate; and
forming an insulating pattern on a side of the conductive trace facing away from the center of the base substrate, the insulating pattern located between the first insulating layer and the base substrate and the conductive trace surrounding a touch area, wherein the touch area includes the touch electrode.

3. The method of claim 2, wherein the conductive trace is disposed in the same material as the touch electrodes.

4. The method of claim 1, wherein the base substrate is a flexible substrate.

5. The method of claim 1, wherein the touch substrate is incorporated in a touch display device.

6. A touch substrate, comprising:
a base substrate;
a touch region disposed on the base substrate;
a touch electrode made of nano-silver, the touch electrode including first touch electrodes arranged along a first direction and second touch electrodes arranged along a second direction, the first direction intersecting the second direction;
a first insulating layer on a side of the touch electrode away from a center of the base substrate;
a touch electrode bridge on the first insulating layer, the touch electrode bridge connecting at least one of the first touch electrodes the and second touch electrodes by way of through-holes penetrating the first insulating layer, an etching liquid applied to the touch electrode bridge different from an etching liquid applied to the nano-silver;
a conductive trace located in a routing area of the base substrate;
an insulating pattern on a side of the conductive trace facing away from the center of the base substrate, the insulating pattern located between the first insulating layer and the base substrate and the conductive trace surrounding a touch area, wherein the touch area includes the touch electrode;

a touch signal line connected to the touch electrode bridge on the first insulating layer; and a second insulating layer on a side of the touch signal line away from the center of the base substrate.

7. The touch substrate of claim 6, wherein the insulating pattern is the same as a pattern of the second insulating layer.

8. A method for manufacturing a touch substrate, comprising:

providing a base substrate;

forming a nano-silver layer on the base substrate, forming an insulating pattern on a trace area of the base substrate, the trace area located at a periphery of a touch area, patterning the nano-silver layer without the insulating pattern by a photolithography process to form a touch electrode in the touch area of the base substrate, the touch electrode including first touch electrodes arranged along a first direction and second touch electrodes arranged along a second direction, the first direction intersecting the second direction;

forming a first insulating layer; and forming a touch electrode bridge on the first insulating layer by using a photolithography process, the touch electrode bridge connecting at least one of the first touch electrodes and the second touch electrode via a first through-hole penetrating the first insulating layer, etching the touch electrode bridge with a first etching liquid which is different from a second etching liquid applied to the nano-silver.

9. The method of manufacturing a touch substrate of claim 8, wherein the method further comprises:

during forming the insulating pattern, forming an alignment mark on a peripheral region of the base substrate, wherein the peripheral region is located at a periphery of the trace area.

10. The method of fabricating a touch substrate of claim 8, wherein after forming the touch electrode bridge on the first insulating layer by using the photolithography process, the method further comprises:

forming a touch signal line connected to the touch electrode bridge; and forming a second insulating layer covering the touch signal line.

11. The method of fabricating a touch substrate of claim 10, wherein each of the insulating pattern and the second insulating layer are formed by using a same mask.

\* \* \* \* \*